Oct. 29, 1963

T. R. JAMES ETAL 3,108,498

REMOTE CONTROL MANIPULATOR DRIVES

Filed Sept. 19, 1958

INVENTORS
THOMAS R. JAMES
DONALD F. MELTON
ROBERT S. HEDIN

BY Robert E. Horne
William C. Babcock
ATTORNEY

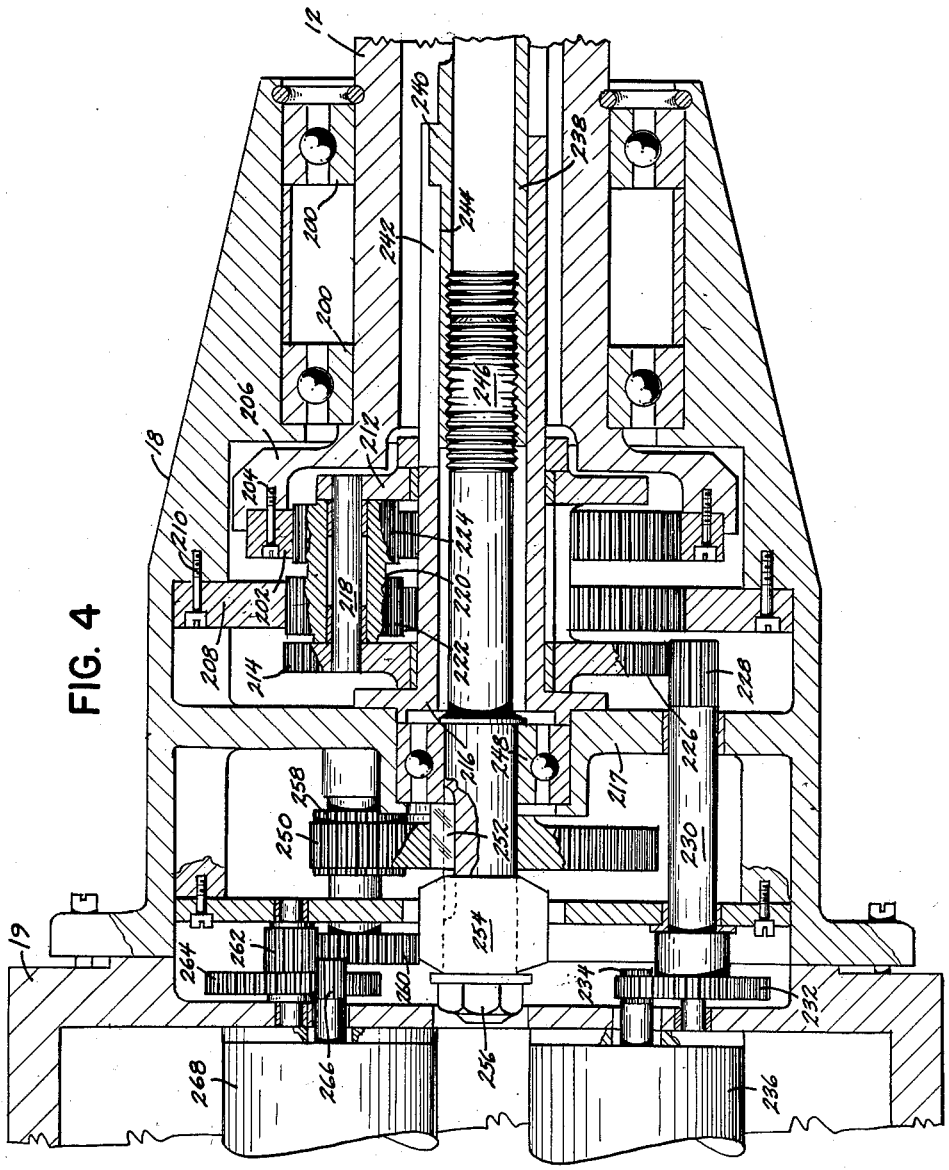

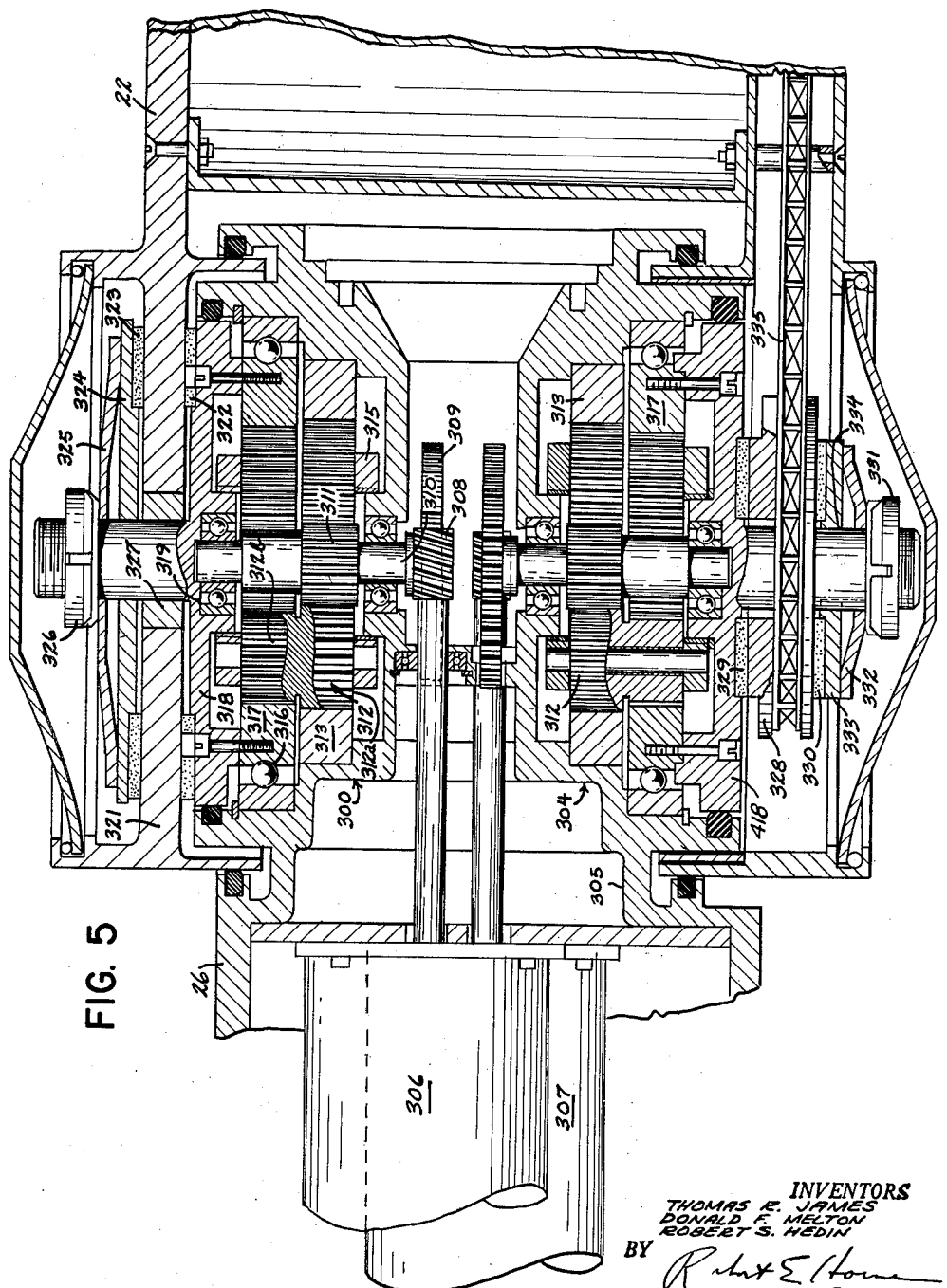

United States Patent Office 3,108,498
Patented Oct. 29, 1963

3,108,498
REMOTE CONTROL MANIPULATOR DRIVES
Thomas R. James, St. Paul, and Donald F. Melton and
Robert S. Hedin, Minneapolis, Minn., assignors to General Mills, Inc., a corporation of Delaware
Filed Sept. 19, 1958, Ser. No. 762,116
5 Claims. (Cl. 74—801)

This application relates to remote control manipulators, and more particularly to improved driving mechanism for such manipulators. Such manipulators have particular utility in the handling of materials which are radioactive or toxic or which are situated in an environment to which a human operator cannot be exposed.

Devices of this type are known in the prior art and may include various operating members connected together in such a way as to provide movements simulating all or part of the motions of a human arm and hand. When the various movements are actuated by power units mounted on the manipulator itself, it is desirable to provide as much power as possible, with minimum bulk and weight in order to provide maximum versatility of operation and utmost visibility in the vicinity of the manipulator for the expeditious handling of loads or performing work functions.

It is one object of the present invention to provide improved driving mechanism for a manipulator, such as a mechanical arm.

It is further object to provide a manipulator in which the desired operating movements of the various members are achieved by an improved combination of differential planetary gear speed reducers.

A still further object is an improved driving connection between two relatively movable manipulator parts in which one ring gear of a differential speed reducer is secured to one of the parts coaxially with the axis of desired rotary or pivotal movement, and a second ring gear of such a reducer is secured to the other part and is also coaxial with the axis of rotation.

Still another object is a manipulator driving mechanism of this type in which one of the internal ring gears of the differential speed reducer is secured to its associated part by a slip clutch or overload connection.

Another object is an improved combination of differential speed reducer parts mounted and connected to provide relative axial rotation of one member with respect to another.

Another object is to obtain manipulator drive mechanism in which the parts of a differential speed reducer are mounted and arranged in a particular manner in combination with a swinging joint of a manipulator.

Other objects and advantages will be apparent from the following specification in which various embodiments of the invention are described. In the drawings accompanying this application and in which like reference characters indicate like parts, FIGURE 1 is a perspective view of a remote control manipulator incorporating features of the present invention;

FIG. 4 is a sectional view on line 4—4 of FIG. 1, and shows details of another driving mechanism for axial rotation;

FIG. 5 is a sectional view on the line 5—5 of FIG. 1 and shows details of driving mechanism for the swinging joints of a manipulator; and FIG. 6 is a schematic sectional view of gearing details taken along line 6—6 of FIGURE 2.

Figure 1:
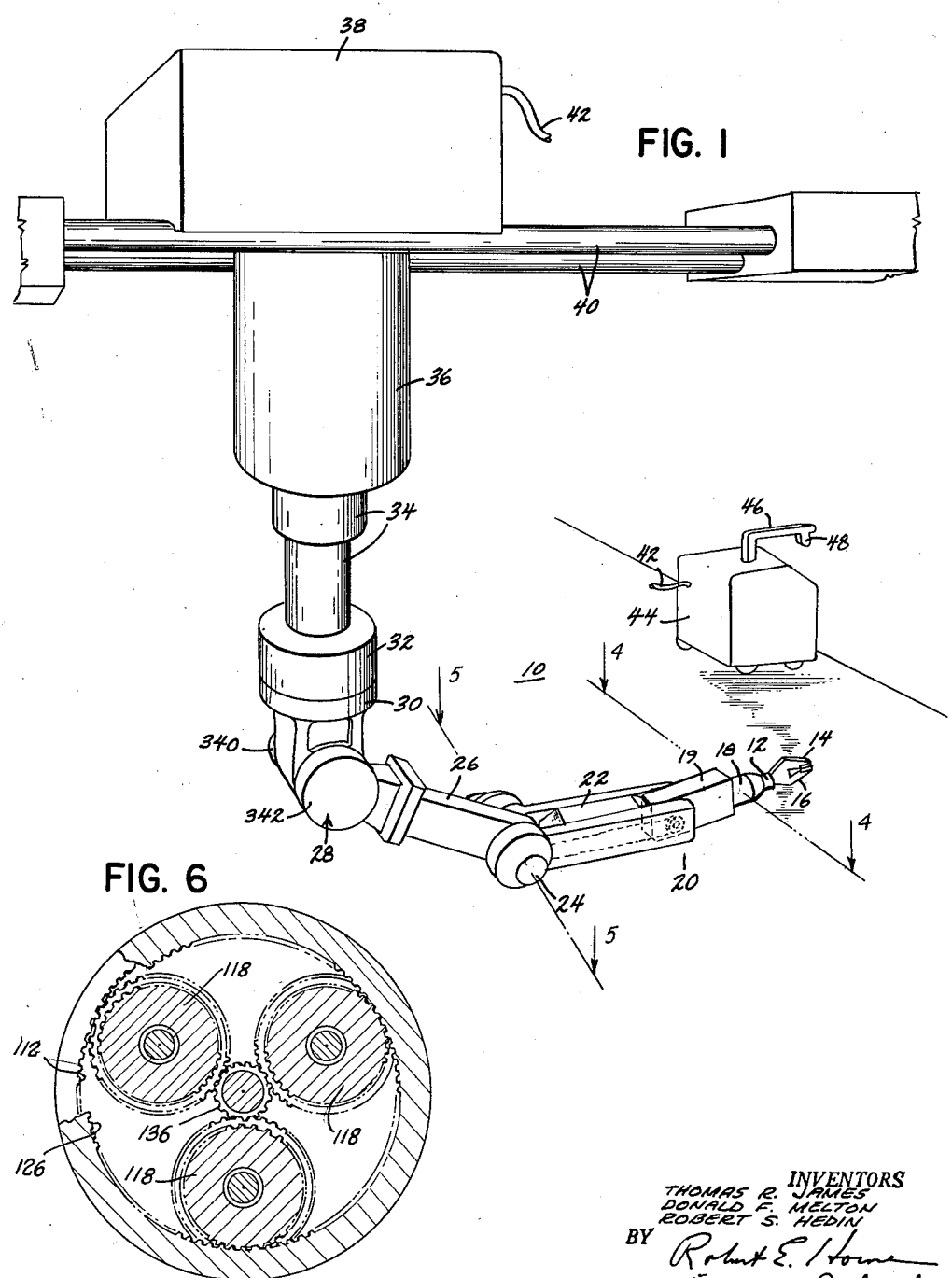

As shown in FIG. 1, the present invention is adapted for use with a manipulator 10 having parts corresponding generally to those of a human shoulder, arm, and hand. Thus a hand member 12 is provided with relatively movable grip members 14 and 16 which may be operated to clasp or engage a desired object. The hand member 12 is mounted for coaxial rotation on the longitudinal axis of a wrist member 18, 19. The relative rotation of member 12 may be considered analogous to a wrist rotation.

Member 19 in turn is pivoted at 20 to a forearm member 22. Thus these members 19 and 22 have relative swinging movement in the manner of a wrist pivot, as distinguished from the wrist rotation movement between members 12 and 18.

Forearm 22 is pivoted on a transverse axis at 24 to an upper arm member 26. Thus the forearm 22 has relative swinging movement with reference to member 26 and the axis of this pivotal swinging movement is analogous to an elbow joint.

Upper arm 26 is in turn pivoted at 28 to a shoulder member 30 for swinging movement around a transverse axis at pivot 28. Shoulder member 30 is mounted for coaxial relative rotation on a shoulder support 32 carried at the outer end of a longitudinally (i.e., vertically) extensible support including telescoping members 34 and 36. This telescoping vertical support is carried by a carriage 38 supported on suitable cross members 40 for lateral translation in known manner. Members 40, in turn, may be part of a travelling crane to provide translating movement at right angles to the rails 40 in known manner.

The various movements of a remote control manipulator just described have been previously obtained in known manner by means of electric motors which are connected by a suitable cable 42 to a remote control console or unit 44. Suitable control members, shown schematically at 46, with a hand grip portion 48, may be moved by an operator to cause the desired movements of the manipulator parts. Details of appropriate motor control circuits and control members are known in the art, as shown, for example in the co-pending applications of T. R. James, Serial No. 243,705, filed August 25, 1951, now U.S. Patent No. 2,861,700, for Remote Control Manipulator; of A. H. Youmans, Serial No. 190,387, filed October 16, 1950, now U.S. Patent No. 2,861,699, for Method and Apparatus for Performing Operation at a Remote Point; and of C. H. Bergsland et al., Serial No. 736,285, filed May 19, 1958, now U.S. Patent No. 2,861,701, for Remote Controlled Handling Unit, all of which are assigned to the assignee of the present invention.

According to one feature of the present invention, differential planetary gear speed reducers are utilized to provide the driving connections between various manipulator parts. These reducers are combined with the various members to provide compact and efficient mechanisms which permits the use of high speed motors and provides a high reduction ratio for desired low output speeds to obtain maximum power from minimum bulk. As indicated in FIG. 1, two types of rotation are involved, i.e, coaxial rotations, such as wrist rotation, and swinging or bending movements, such as elbow rotation.

Figure 2:
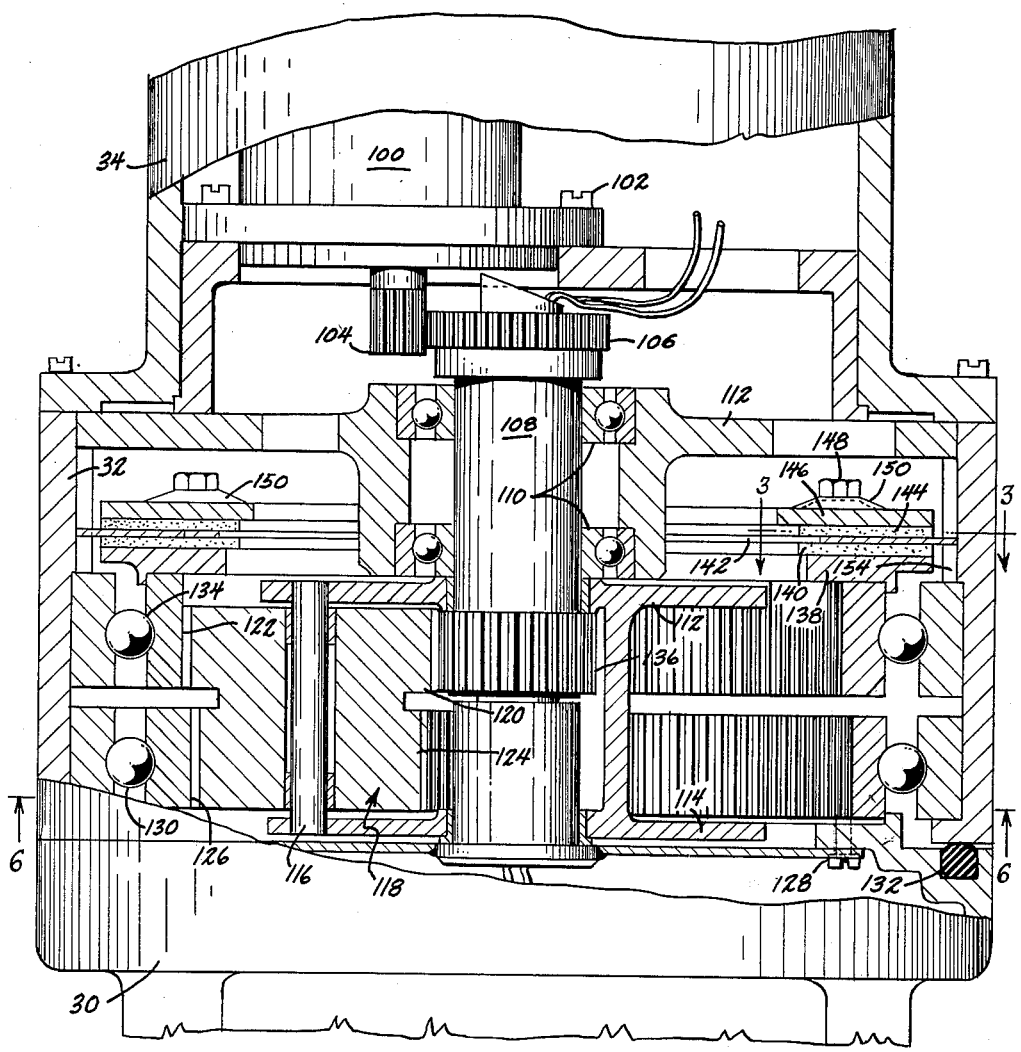
FIG. 2 is a sectional view on the line 2—2 of FIG. 1, and shows details of one driving mechanism for axial rotation.
Figure 3:
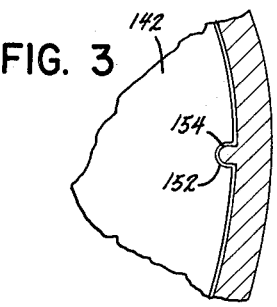
FIG. 3 is a partial sectional view on the line 3—3 of FIG. 2.

As one embodiment of the invention involving relative coaxial rotation, the relative rotation between shoulder 30 and shoulder support 32 is illustrated in detail in FIGS. 2 and 3. Here the driving power is provided by a motor 100 which is preferably a high speed unit which can provide substantial horsepower with minimum bulk. Motor 100 is secured at 102 to a supporting member in the shoulder support or its associated tube 34. The motor shaft includes a driving pinion 104 which engages a gear 106 of the shoulder pivot drive shaft 108. Shaft 108 is supported in bearings 110 for rotation on a vertical axis, i.e. coaxially of the longitudinal axis of supporting tube 34, shoulder support 52 and shoulder 30.

One the lower end of the drive shaft 108, members 112 and 114 of a planetary gear cage are rotatably supported. One or more planetary shafts 116 carried by the cage support planetary gear units indicated generally at 118. Preferably three such gears will be equally spaced around the central drive shaft 108 to provide a self-centering balanced driving arrangement.

Each planetary gear member 118 includes two gear portions which rotate together as a unit around the planetary shafts 116. The input gear portion 120 has driving engagement with the internal teeth of a coaxial first ring gear 122, which is secured in a manner described below to the shoulder support 32. A second planetary gear portion 124 engages the internal teeth of a second ring gear member 126, which is secured at 128 to the rotatable shoulder member 30. Second ring gear 126 is also coaxial with drive shaft 108, i.e., with the axis of relative coaxial rotation of the shoulder and its support.

A suitable bearing 130 is provided between the second ring gear 126 and the housing of shoulder support 32. This bearing effectively supports the shoulder on the shoulder support for the desired relative axial rotation. A sealing member 132 between the rotary shoulder and the shoulder support protects the internal working parts. Thus in the particular embodiment shown, the second ring gear of the differential speed reducer also serves as part of the bearing for the shoulder itself.

A further bearing member 134 is provided between the first ring gear 122 and the housing of shoulder support 32 to permit limited relative rotation of the first gear, under circumstances described below.

The planetary cage members 112 and 114 and their associated gear 118 are caused to rotate around drive shaft 108 by the engagement of a sun gear 136, on the drive shaft, with the input portions 120 of the respective planetary gears. Since these gears also engage the internal teeth of the first ring gear 122, which is generally held stationary within housing 32, the planetary cage members 112 and 114 will be caused to rotate around the axis of shaft 108. The effective driving ratios between the planetary gear input portion 120 and its first ring gear 122 and between the planetary gear output ring gear 126 are slightly different. The effective difference is achieved in known manner by the use of a slightly different number of teeth of by differences in diameter of the respective gear portions. In FIG. 2, the output gears have have slightly smaller diameters.

Because of this difference in effective driving engagement, and because the gear portion 124 remains in engagement at all times with second ring gear 126, the second ring 126 and its associated shoulder 30 will be driven around the axis of shaft 108 at a reduced speed which is much slower than the rate of rotation of drive shaft 108. In fact, with gearing of the arrangement shown, it is possible to achieve substantial reductions, so that a motor operating at effective speeds of the order of 6,000 r.p.m.'s can rotate the second ring gear 126 and shoulder member 30 at speeds as low as 1 r.p.m.

As indicated above, bearing 134 is provided to permit limited relative rotation of the first ring gear 122 within housing 32. This relative rotation is provided in order to permit the compact assembly of a suitable frictional overload slipping mechanism such as an overload release brake mechanism. Thus the first ring gear 122 has secured to its upper face a brake plate 138 with a brake facing 140. A cooperating brake plate 142 (see also FIG. 3) is held against the brake face 140 by a cooperating surface 144 on plate 146. The various brake plates are held in axial engagement with each other by appropriate connections including a bolt and a securing nut 148, which can adjust the force of braking engagement through a brake spring 150. Thus the first ring gear 122 is effectively connected to brake plate 142 in an manner to prevent relative rotation between these parts around the axis of shaft 108 unless predetermined torques are exceeded.

Brake plate 142 is supported within the shoulder support casing 32 as shown in FIG. 3. To permit limited axial movement of the plate 142 for different adjustments of the brake members a series of peripheral notches or recesses 152 around the edge of brake plate 142 are designed for the interfitting engagement with retaining lugs 154 on the inner surface of shoulder support casing 32, to prevent relative rotation between plate 142 and the casing. Thus relative rotation of the brake plate 142 is prevented at all times. This in turn prevents relative rotation of first ring gear 122 until or unless the rotary movement of shoulder 30 causes engagement with some obstacle which provides more than a predetermined resistance to further rotation. Depending on the tension of the brake springs 150, as adjusted by nuts 148, relative rotation can occur between brake plate 142 and the first ring gear 122 to prevent damage to the parts, when more than a predetermined safe resistance to rotation is encountered.

The foregoing construction thus provides a driving mechanism for coaxial rotation of a shoulder or other manipulator element by means of a differential planetary gear speed reducer having its first ring gear secured to one member and its second ring gear secured to the other member, with an overload release brake connection between one of said gears (in this case the first ring gear) and its associated member. In this embodiment the planetary gear assembly of the reducer is driven by means of a sun gear from a central shaft.

According to a further embodiment of the invention it is possible to provide such an axial rotation with a differential speed reducer in which the planetary gear assembly is driven by means other than a sun gear in order to provide increased space along the axis of the assembly for other mechanism. Such an embodiment of the invention is illustrated in connection with the wrist rotation movement between members 12 and 18 of the manipulator of FIG. 1. The mechanism by which this rotation is achieved is shown in detail in FIG. 4.

The rotatable hand portion 12 is supported in bearings 200 within the relatively stationary wrist or hand portion 18. The inner end of member 12 supports the second ring gear 202 of a differential planetary gear speed reducer. Second gear 202 is secured at 204 directly to a portion 206 of the rotatable hand member 12.

The first ring gear 208 of the differential speed reducer is in turn secured at 210 directly to member 18. In this case both ring gears are directly connected to the respective coaxially rotatable members, with no intervening slip clutch or overload release brake connection.

The planetary gear assembly of the reducer includes cage members or plates 212 and 214 which are rotatably and coaxially supported on a tubular extension 216 secured to a supporting web 217 within member 18. Planetary gear support members 212 and 214 are connected by appropriate planetary gear shafts 218 one of which is shown in FIG. 4. On this shaft a planetary gear member 220 is rotatably mounted. This gear includes an input gear portion 222 and an output gear portion 224. These portions engage the respective first and second gear rings 208 and 202. As previously described, the effective driving ratio of the respective engagements is slightly different, so that rotation of the planetary gear assembly within the fixed first ring 208 results in much slower rotation of the second ring 202 and its associated hand member 12.

In this case, the planetary gear assembly is driven in a manner which leaves the central axis of the assembly open for the passage of other desired working parts. Thus instead of the usual sun gear, the planetary gear assembly is rotated by means of gear teeth 226 associated with the planetary support member 214. The gear 226 is driven by a pinion 228 on shaft 230 which in turn is driven through gears 232 and 234 from the shaft of wrist rotation motor 236. Thus a high speed motor can be used at 236 to provide substantial horsepower at high speed, and the particular arrangement of different speed reducer elements will drive the hand member 12 at the desired slower output rate.

In this case the ommission of the sun gear in the differential speed reducer facilitates the mounting and operation of means to actuate the hand grip members 14 and 16. These grip members are designed for operation in known manner by axial movement of a sleeve member 238 within the hand. Member 238 is telescopingly received within the tubular extension 216 on which the planetary gear assembly is rotatably mounted. A key 240 on sleeve 238 engages a slot 242 in member 216 to prevent relative rotation of sleeve 238. The sleeve 238 is internally threaded at 234 for engagement by a coaxial threaded shaft 246 supported in bearings 248 in web 217. The threaded shaft is rotated by a gear 250 keyed to the shaft at 252 in such a way as to permit limited axial movement of the shaft within both gear 250 and bearing 248.

A spring unit 254 is secured at the end of the shaft between an adjusting and retaining nut 256 and gear 250 to normally hold the threaded shaft 246 in the position shown in the drawing. As the gear 250 is rotated, the threaded shaft 246 draws the extension 238 to the left in FIG. 4 to close the grip members 14 and 16 (FIG. 1) in known manner. The tension of the grip members, as they encounter a particular object, is then determined by the extent to which further rotation of gear 250 causes axial compression of springs 254 once further axial movement of sleeve 238 is prevented by the gripping engagement of the hands. Such further rotation of gear 250 and threaded shaft 246 draws the shaft to the right in FIG. 4 and this compresses springs 254 to provide gradually increasing tensions for the grip members.

Gear 250 is rotated in either a hand closing or hand opening direction by gear 258 through appropriate intermediate gearing 260, 262, 264, and 266. Gear 266 is a pinion on the shaft of hand grip motor 268. The grip actuating mechanism thus extends conveniently through the parts of the differential speed reducer to facilitate operation of the grip members by a motor conveniently supported on the stationary hand portion 18, 19 rather than on the rotatable portion 12.

Thus the coaxial combination of a differential speed reducer with two manipulator members which are mounted for relative coaxial rotation around a common longitudinal axis, and with the first and second ring gears of such a reducer secured to the respective manipulator members, provides a convenient, efficient and compact assembly of parts with a high reduction ratio between the driving motor and rotatable member.

According to a further feature of the invention, the relative swinging or bending movements around an axis extending transversely of two manipulator arms or parts may also be achieved by a compact and efficient arrangement of differential planetary gear speed reducer parts. One such arrangement is exemplified in FIG. 5, wherein a detailed section at the elbow joint 24 of FIG. 1 is shown. At this joint, one differential speed reducer arrangement 300 is mounted on the axis of elbow joint 21 to produce the desired swinging movement of forearm 22. A second differential speed reducer 304 may also be supported coaxially of this transverse pivotal axis and connected by a chain drive 335 to control the wrist bending motion at the transverse wrist pivot 20. As shown in FIG. 1, chain 335 drives a sprocket 302 secured to the wrist member 19 to swing members 19, 18 and 12 as a unit around pivot 20, when the chain is moved.

Specifically to carry out these motions, the two differential speed reducer gear drives 300 and 304 are mounted within frame 305 of forearm member 26 and are driven by a forearm swing motor 306 and a wrist bend motor 307 respectively. Both motors are mounted in upper arm 26 to reduce the bulk and weight of the forearm and wrist members.

Motor 306 drives worm gear 308 to rotate gear 309 and shaft 310. Integral with shaft 310 is a sun gear 311 which engages differential planetary gears 312. Such differential planeary gears are well known in the art and three such planetary gears are preferably supported around the sun gear to provide a balanced, self centering arrangement as shown in FIG. 6. For clarity, only one such gear is shown in FIG. 5. The planetary gears 312 each comprise respective input and output gear portions 312a and 312b with input gear portion 312a having a larger diameter than output portion 312b to produce the desired differential speed reduction through different effective driving ratios Gear portion 312b may also have a slightly smaller number of teeth than gear 312a for this purpose. The planetary gears 312 are rotatably supported by planetary shafts 314 carried by a rotatable planetary cage assembly 315. This cage is freely rotatable as a unit relative to both the supporting housing 305 and the shaft 310.

Secured to frame 305 and engageable with input gear portion 312a is the internally toothed first ring gear 313. Thus the rotation of sun gear 311 causes planetary gears 312 to rotate on their axes 314. The further engagement of gears 312a with first ring gear 313 then causes rotation of cage 315 and gears 312 around shaft 310. A rotatable second ring gear 317 is rotatably supported coaxially of shaft 310 by bearing structure 316, and is engaged by output gear portion 312b. As the gear 312b rotates on its own axis and also revolves around shaft 310, the different effective gear ratio causes rotation of second ring gear 317 at relatively slow speed.

An overload release brake plate 318 is secured to second ring gear 317 by suitable bolts and is rotatable as a unit therewith on bearings 319 at the outer end of shaft 310. Integral with overload release brake plate or spider 318 is a shaft 320 which serves as the pivotal supporting axis for a bearing flange 321 on forearm 22. Located between plate 318 and forearm bearing flange 321 is an overload release brake surface plate 322. Another brake plate 323 frictionally engages the outer face of forearm bearing flange 321. Pressure is applied to brake plate 323 through supporting plate 324 and spring 325 in conjunction with adjustable nut 326 which threadably engages the end of shaft 320. By tightening nut 326 against spring 325 pressure is applied to plate 324 to force brake plate 323 against the forearm bearing flange or extension member 321, and to force the latter against brake surface 322 and plate 318.

Thus a direct drive through an overload release brake is achieved by which rotation of second ring gear 317 and brake plate 318 produces a swinging or pivoting action of forearm 22. Should the load on forearm 22 becomes too great for the tension applied at the slip clutch plates, forearm bearing flange 321 would slip relative to plates 318 and 322 and would turn as needed on shaft 320 on bushing 327. This differential speed reducer arrangement, with first and second gear rings, one of which is secured to each of two relatively swinging arm elements, produces a compact assembly coaxially of the desired transverse pivot. The connection of one ring gear (in this case the second ring gear) to its associated arm by an overload release brake connection provides further overload protection with minimum parts.

FIG. 5 also illustrates the coaxial mounting of a second differential speed reducer 304 at elbow joint 24. In speed reducer 304 the action of sun gear 311 with planetary gears 312 and first and second ring gears 313 and 317 is the same as described in conjunction with differential speed reducer 300. Overload release brake plate 418 attached to second ring gear 317 is thus rotated at reduced speed. In this case, however, a chain sprocket or drive gear 328 is driven by engagement between brake plates 329 and 330, with tension applied to the brake plates by nut 331 acting against spring 332 and plate 333. The nut 331 is threaded on shaft 334 integral with plate 418. As plate 318 turns, so turns chain drive gear 328 to move chain 335 and thus drive chain sprocket 302 (FIG. 1) at the pivotal axis of the wrist joint 20 to produce a swinging action of the wrist member 18—19 and hand 12.

With the combined differential gear drive at elbow joint 24 and with particular reference to differential speed reducer 304 it is possible to produce the desired bending motion in the wrist member 18—19 with the motor and differential speed reducer removed from that part of the arm or manipulator. However, where operating requirements permit the coaxial mounting of the speed reducer on the transverse axis of the member to be pivoted, the construction is preferably simplified by direct connection of the second ring of the differential speed reducer to the member to be swung, as in the case of forearm motor 306, reducer 300 and forearm portions 321 and 22.

According to the present invention the swinging movement of the upper arm on its shoulder may also be driven by a differential speed reducer combination. The type of unit described for swinging the elbow joint, including speed reducer 300, may be used for this drive. As illustrated in FIG. 1, this mechanism for swinging the upper arm includes a motor (not shown) mounted within shoulder member 30, a release brake 340 coaxially mounted at one end of the shoulder joint axis, and a differential planetary gear speed reducer 342 coaxially mounted at the other end of the shoulder joint axis. The second ring gear of the speed reducer is directly connected to an output shaft which serves as the pivotal support and driving means for supporting and swinging the upper arm. The first ring gear of the speed reducer is fixed with reference to the shoulder 30. The input drive shaft which carries a sun gear to actuate the planetary cage and gears of the reducer extends rotatably and coaxially through the output shaft to the slip clutch and is driven through the clutch by the shoulder swing motor. Details of such an upper arm swing drive are further described, and certain features of such a drive are separately claimed in a co-pending application of D. F. Melton et al. entitled "Drive Means for Remote Control Manipulator," filed of even date herewith and assigned to the same assignee as the present invention.

The constructions described herein exemplify the manner in which the objects of this invention may be achieved. The description indicates the principles involved in the present invention and some of the ways in which the invention may be practiced.

Now, therefore, we claim:

1. A power driven manipulator comprising at least three members connected together to form first and second joints, a first member connected to a second member for pivotal movement with respect to said second member about a first axis, a third member connected to said second member for pivotal movement with respect to said second member about a second axis, means for pivoting said second member with respect to said first member including a first differential planetary gear speed reducer mounted coaxially of one of said axes and first motor means operatively connected to said speed reducer, means for pivoting said third member with respect to said second member including a second differential planetary gear speed reducer mounted coaxially of one of said axes and second motor means operatively connected to said speed reducer, each speed reducer including a planetary gear cage mounted coaxially of the axis for relative rotation about said axis, means for rotating said gear cage including a first internally toothed ring gear secured to one of said members, at least one planetary gear rotatably mounted on said gear cage, said planetary gear including a first gear portion and a second gear portion, a second internally toothed ring gear secured to said member which is connected to said one member for pivotal movement with respect thereto, the first gear portion of said planetary gear engaging the first ring gear, the second gear portion of said planetary gear engaging the second ring gear, said gear engagements providing different driving ratios with respect to each other, whereby pivotal movement of said member which is connected to said one member is caused as the gear cage rotates in response to actuation of the motor means.

2. The combination of claim 1 wherein both speed reducers are mounted coaxially of the first axis, and means are provided for operatively connecting the second speed reducer to the third member whereby pivotal movement of said third member about the second axis is achieved in response to actuation of said second motor means.

3. The combination of claim 1 wherein an overload release brake is provided for permitting at least one of the first ring gears to move with respect to said one of said members if a load in excess of a predetermined magnitude is exerted against the said member which is connected thereto for pivotal movement with respect thereto.

4. A power driven material handling apparatus comprised of a plurality of members connected together to form a multi-component manipulator, said manipulator including a support member, a first member connected to said support member and mounted for rotational movement about its own longitudinal axis, a second member connected at one end to said first member for pivotal movement with respect to said first member about a first axis which is transverse to said longitudinal axis, a third member connected at one end to said second member for pivotal movement with respect to said second member about a second axis which is transverse to said longitudinal axis, said third member being mounted for rotatable movement about its own longitudinal axis, and means for moving each of said members about one of said axes associated therewith including a differential planetary gear speed reducer mounted coaxially of said one of said axes and motor means operatively connected to said speed reducer, each speed reducer including a planetary gear cage mounted coaxially of said one of said axes for relative rotation about said one of said axes, means for rotating said gear cage including a first internally toothed ring gear secured to one of said members, at least one planetary gear rotatably mounted on said gear cage, said planetary gear including a first gear portion and a second gear portion, a second internally toothed ring gear secured to said member which is connected to said one member for one of said movements with respect thereto, the first gear portion of said planetary gear engaging the first ring gear, the second gear portion of said planetary gear engaging the second ring gear, said gear engagements providing different driving ratios with respect to each other whereby relative movement of said member which is connected to said one member is caused to move about said one of said axes as the gear cage rotates in response to actuation of the motor means.

5. The combination of claim 4 wherein an overload release brake is provided for permitting the first ring gear to move with respect to said one of said members if a force in excess of a predetermined magnitude is exerted against the said member which is connected to said one member.

References Cited in the file of this patent
UNITED STATES PATENTS

| | | |
|---|---|---|
| 1,347,785 | Libby | July 27, 1920 |
| 1,923,225 | Moorhouse | Aug. 22, 1933 |
| 2,280,652 | Lamond | Apr. 21, 1942 |
| 2,363,093 | Sprake | Nov. 21, 1944 |
| 2,401,875 | Lawler | June 11, 1946 |
| 2,494,368 | Steele et al. | Jan. 10, 1950 |
| 2,548,045 | Nichols | Aug. 10, 1951 |
| 2,621,544 | Rossman | Dec. 16, 1952 |
| 2,622,455 | Hayek | Dec. 23, 1952 |
| 2,679,170 | Prittie | May 25, 1954 |
| 2,858,947 | Chapman | Nov. 4, 1958 |
| 2,861,699 | Youmans | Nov. 25, 1958 |